F. D. VAN NORMAN.

TOOL HOLDER FOR LATHES.

APPLICATION FILED MAR. 31, 1911.

Reissued June 24, 1913.

13,584.

WITNESSES:

H. L. Sprague

R. M. Mowry

INVENTOR,

Frederick D. Van Norman,

BY

W. C. Rellons

ATTORNEY.

COLUMBIA PLANOGRAPH CO., WASHINGTON, D. C.

UNITED STATES PATENT OFFICE.

FREDERICK D. VAN NORMAN, OF SPRINGFIELD, MASSACHUSETTS, ASSIGNOR, BY MESNE ASSIGNMENTS, TO VAN NORMAN MACHINE TOOL COMPANY, OF SPRINGFIELD, MASSACHUSETTS, A CORPORATION OF MASSACHUSETTS.

TOOL-HOLDER FOR LATHES.

13,584. Specification of Reissued Letters Patent. Reissued June 24, 1913.

Original No. 979,903, dated December 27, 1910, Serial No. 572,964. Application for reissue filed March 31, 1911. Serial No. 618,258.

*To all whom it may concern:*

Be it known that I, FREDERICK D. VAN NORMAN, a citizen of the United States of America, and resident of Springfield, in the county of Hampden and State of Massachusetts, have invented certain new and useful Improvements in Tool-Holders for Lathes, of which the following is a full, clear, and exact description.

This invention relates to improvements in tool posts or holders for tools to be carried for the performance of their work by the slide rest of a lathe; and the object is to provide a tool holder which is available and efficient to securely hold in presentation to the work in the lathe, tools, the shanks of which may be of many different sizes or proportions cross sectionally, with, nevertheless, the capability of having the cutting end of the tool, irrespective of the size of the shank, always held in adjustment at the proper, and generally the same height relatively to the longitudinal line of the lathe coincident with the centers thereof.

The invention is described in conjunction with the accompanying drawings and is set forth in the claims.

Figure 8:
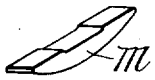
Figure 1:
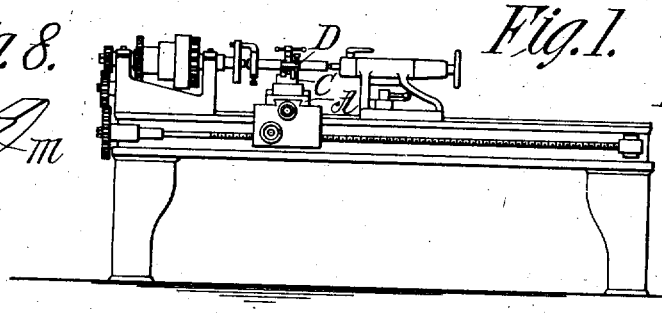
Figure 9:
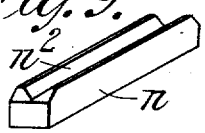
Figure 3:
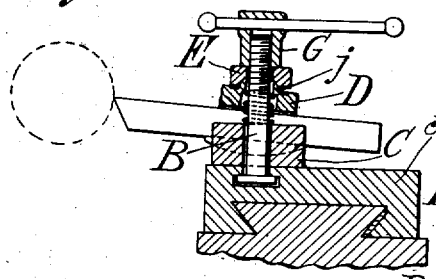
Figure 2:
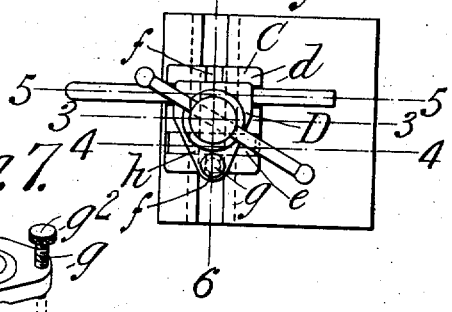
Figure 7:
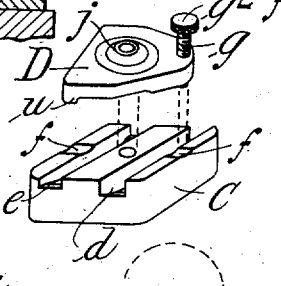
Figure 4:
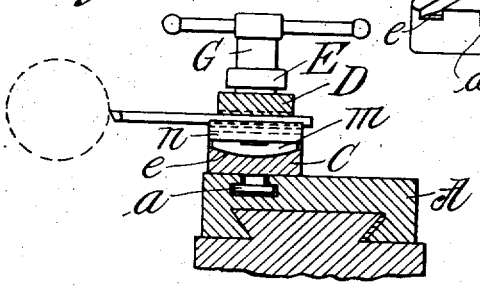
Figure 5:
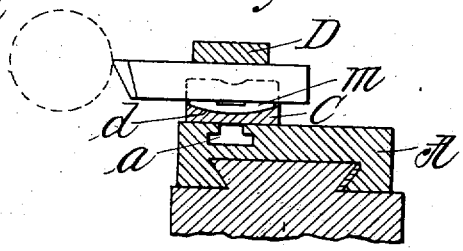
Figure 6:
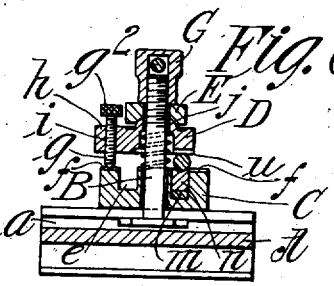

In the drawings: Figure 1 is a side elevation of an engine lathe in which the location on the slide rest thereof of the present tool holder is indicated. Fig. 2 is a plan view of the tool holder. Fig. 3 is a vertical sectional view of the tool holder on line 3—3, Fig. 2. Figs. 4 and 5 are sectional views as seen in the same direction as Fig. 3, but taken on the planes indicated by the lines 4—4 and 5—5, Fig. 2, and showing tools of different kinds and sizes held therein. Fig. 6 is a vertical sectional view taken on line 6—6, Fig. 2. Fig. 7 is a perspective view of the upper and lower clamp blocks comprised in the tool holder, and Figs. 8 and 9 are perspective views of a plurality of rest bars or base supports for tools to be interchangeably used in this particular tool holder.

Similar characters of reference indicate corresponding parts in all of the views.

In the drawings, A represents the slide rest of the usual form and having the capabilities for movements as common in lathes, the same having as an appurtenance thereto the upstanding post B which by an enlargement at its bottom has an adjustable engagement in a T-slot *a* in the slide rest.

The tool holder comprises lower and upper clamping blocks C and D having vertical apertures, as shown in Figs. 3 and 6, through and upwardly beyond which the post B is passed.

The lower clamping block C has a pair of parallel, straight, upwardly opening channels *d*, *e*, which open also endwise at the edges of the block, and which channels, as is to be clearly understood and perceived in Figs. 6 and 7, are of varying depths. The bases of the said channels *d* and *e* are similarly curved on arc lines of the same radius, as shown in Figs. 4 and 5. The lower clamping block C has at opposite portions thereof which are outwardly beyond and in a line with each other at right angles to the lengths of said channels, upwardly opening depressions *f*, *f*, the bases of which are curved to constitute rocking bearings or bottoming supports for the screw *g* which is carried by an extension *h* of the upper clamping block D. The lower clamping block may swivel for a full or any portion of a rotation about the post, as may also the upper clamping block in unison with the lower one, or the upper clamping block may be revolubly reversible so that it may be changed end for end relatively to the lower block, and so that its extension with the screw *g* carried thereby may have an engagement or bottoming in either of the depressions *f*, *f*, at the opposite sides of the said channels of the different depth. The said extension *h* of the upper clamping plate has a vertical threaded hole *i* through which the shank of the screw *g* engages; and the said screw *g* has at its lower end a rounded formation for its rocking bearing in either of the aforesaid depressions *f* of the lower clamping block, while such screw has at its upper end a suitably enlarged head $g^2$ whereby the screw may be vertically adjusted relatively to the upper clamping plate so that the rocking bearing or fulcrum by which the clamping plate may be tilted to an oblique plane as represented in Fig. 3, according as a tool in a holder is more or less inclined, may be nicely regulated.

The upper clamping plate D as shown in Figs. 3 and 6, has, surrounding its vertical aperture for the post B, an upwardly projecting annular rib *j*, the external surface of which is curved on an arc of a circle generated from a point which is coincident with the axis of the aperture for the post and which is below the top surface of such upper clamping plate, while the hole or aperture for the post below the base of the aforesaid curved annular rib is downwardly enlarged or widened so that the clamping plate may rock or tilt to sufficient extent without being obstructed by the post.

E represents a collar of comparatively slight height which surrounds the post above the upper clamping block, the same having a depression or concavity in its underside for the rolling engagement therein of the aforesaid annular rib *j*; and G represents a locking nut which screw engages on the upper threaded extremity of the post and is operative by being more or less far screwed down, as occasion requires, to confine the upper clamping block to firmly bind between the latter and the lower clamping plate, the shank of any tool of any size and in a horizontal or any oblique adjustment.

For the tool post and for employment in conjunction with the lower clamping block having the channels of unequal depths, rest bars or base supports are provided such as represented by the reference letters *m* and *n* and particularly shown in Figs. 8 and 9. The rest bar *m* has its bottom downwardly bowed or of arc form corresponding to the curvature of the bases of both of the channels *d* and *e*, while it has a flat top and the tool base support or rest bar *n* has a flat straight bottom and a V-groove $n^2$ throughout the length of its upper edge.

When a tool having a rectangular shank and of considerable height is to be confined in the tool post, the curved base member *m* may be placed in the channel *d* of the lower clamp block and the tool shank brought to rest thereon, while a portion of its thickness protrudes above the top of the lower block and may be clamped by the upper block D; or in case a cross sectional rectangular tool shank of considerably less height is to be held, the interchangeable member *m* will be transferred into the channel *e* of the lesser depth so that the tool shank in resting on such member will still have its upper surface above the top of the lower clamping block; and, therefore, the shanks of cross sectional rectangular tools of different thicknesses may by the transferring of the member *m* be mounted so that their working points will be more or less nearly, or the same, height; and, of course, any variations in the height of the working end of the tool may be compensated for by the rocking of the said curved base member so that the cutting end of the tool may be either slightly elevated or depressed. It may also be here stated that the widths of the rectangular tool shanks may be very slightly less than the widths of the channels, or they may be much less than the widths of such channels as the clamping action is obtained on the upper and lower surfaces of the tool shank.

Now in cases where tools the shanks of which are cross sectionally round are employed, the supplemental rest bar or base support *n* having straight bottom and V-shaped groove in its top, will be employed in conjunction with the curved bottom or rocker base *m*, such members *m* and *n* being together placed in either the deep or shallow channel *e* or *d* accordingly as the round tool shank to be held is of considerable or comparatively slight diameter; and the minute adjustments, for the proper positioning of the working ends of the tools, may be accomplished by the appropriate rocking of the member *n*.

The provision of the tool holder having the structural features and capabilities of the one comprising this invention enables a mechanic to most readily and conveniently mount and accurately adjust many different tools the shanks of which are of widely varying shapes and dimensions, and, moreover, the tool holder may be as effectively used for carrying tools for boring or reaming as those for external turning.

I claim:—

1. A tool holder comprising a base block and an upper clamping block and means for imparting a clamping bind thereto, the base block having a plurality of upwardly opening channels of varying depths with curved bases, and a tool supporting rocker member having a curved bottom and adapted for engagement in either of said channels.

2. A tool holder comprising a base and an upper clamping block and means for imparting a clamping bind thereto, the base block having a plurality of upwardly opening channels of varying depths and a tool supporting member adapted for engagement in either of said channels.

3. In a lathe tool holder the combination with a slide rest having an upright post adjustably engaged therein, of lower and upper clamping blocks having vertical apertures through which said post passes and whereby said blocks are swiveled on the post, the lower block having a plurality of upwardly opening channels of varying depths in portions at different sides of the post and means screw engaging on the post and operative against the upper block for confining it in its engagement with a tool in either of said channels.

4. The combination with a slide rest having an upright post adjustably engaged therewith, of lower and upper clamping blocks having vertical apertures through which said post passes, the lower block having to one side of the post a tool support adjustably engaged therein, and having on the opposite side of said post an outwardly extending and upwardly opening curved depression in the top thereof, and the upper clamping block having an extension to overlie the said curved depression provided with a vertical threaded hole and a screw having an operating head, engaged in said hole, the said screw having a rounded lower end for a rocking engagement in said curved depression, and means, screw engaging on the post and operative against the upper clamping block for confining it in its engagement with a tool in the said tool support.

5. The combination with a tool holder having an upright post, of lower and upper clamping blocks having apertures for said post, the upper block having on its upper face a curved faced rib surrounding the post aperture through said block, a collar surrounding the post and having a recess curved to fit said rib, and means screw engaging with the post and operative through said collar for exerting a clamping pressure against the upper clamping block.

6. The combination with a tool holder having an upright bolt, of lower and upper clamping blocks having apertures for said bolt, the lower block having two upwardly opening channels with curved bases, a tool supporting member adapted for engagement in either of the channels, the upper block having its one end formed for engagement on a tool shank and its opposite end adjustably supported on the lower block, and means carried by the bolt and located above the upper block for imparting a clamping bind thereto.

7. In a tool holder in combination, an upright bolt, a base block and an upper clamping block having apertures for said bolt, the base block being provided with an upwardly opening channel having a curved base, and a tool rest having a curved base supported therein, the upper block having on its upper face a curved faced rib surrounding the bolt aperture through said block, a binder nut screw engaged on the upper portion of said bolt and a collar surrounding said post, said collar being interposed between the said nut and upper block and having a recess curved to fit said rib.

8. A tool holder comprising a base provided with an adjustable tool support, an upper clamping block having its one end screw supported on the base and its other end adapted to overlie the tool support and having its upper central portion of raised curved rib formation, a collar-like member having a recess curved to fit said rib, and means engaging with said member and acting against said upper block for imparting a clamping bind thereto.

9. A tool holder comprising a base having a plurality of openings of varying depths and adapted for the reception of a tool support having a curved bottom, in either of said openings, means for permitting a rocking movement of the clamping block and means for imparting a clamping bind thereto.

10. A tool holder comprising a base clamping block and an upper clamping block and means for imparting a clamping bind thereto, the base block having two upwardly opening channels of varying depths made with curved bases, and a tool rest bar to be engaged in either of said channels and having a curved bottom and a straight top.

11. The combination with a slide rest having an upright post, of lower and upper clamping blocks having vertical apertures through which said post passes, the lower block having to one side of the post a tool rest bar adjustably supported therein, and on the opposite side of said post an outwardly disposed and upwardly opening curved depression, the upper clamping block having an extension to overlie the said curved depression, a screw engaging with said upper clamping block extension and having its lower end rounded for engagement in said curved depression, the upper block having on its upper face and surrounding the post aperture an upwardly extending curved rib, the curved surface of which is generated from a point below the top of the said upper clamping block, a collar surrounding the post having a curved recess to fit the said rib and means screw engaging with the post and acting against said collar for imparting a clamping pressure to the upper clamping block.

12. The combination with a tool holder having an upright post, of lower and upper clamping blocks having apertures for said post, the base block being provided with a tool rest bar adjustably supported therein, the upper clamping block having on its upper face and surrounding the post aperture an upwardly extending curved rib, the curved surface of which is generated from a point below the top of the said upper clamping block, a collar surrounding said post and having a curved recess to fit the said rib, and means screw engaging with said post and acting through said collar for imparting a clamping bind to the upper clamping block.

FREDERICK D. VAN NORMAN.

Witnesses:

WM. S. BELLOWS,

G. R. DRISCOLL.

Copies of this patent may be obtained for five cents each, by addressing the "Commissioner of Patents, Washington, D. C."